US009983298B2

(12) United States Patent
White (10) Patent No.: US 9,983,298 B2
(45) Date of Patent: May 29, 2018

(54) FIBER OPTIC BASED LASER RANGE FINDER (71) Applicant: Associated Universities, Inc., Washington, DC (US)

(72) Inventor: Steven White, Arbovale, WV (US)

(73) Assignee: Associated Universities, LLC, Washington, DC (US)

(*) Notice: Subject to any disclaimer, the term of this patent is extended or adjusted under 35 U.S.C. 154(b) by 283 days.

(21) Appl. No.: 15/013,251

(22) Filed: Feb. 2, 2016

(65) Prior Publication Data
US 2016/0231418 A1 Aug. 11, 2016

Related U.S. Application Data (60) Provisional application No. 62/112,234, filed on Feb. 5, 2015.

(51) Int. Cl.
G01C 3/08 (2006.01)
G01S 7/481 (2006.01)
G01S 17/10 (2006.01)
G01S 17/36 (2006.01)

(52) U.S. Cl.
CPC ............ G01S 7/4818 (2013.01); G01S 17/10 (2013.01); G01S 17/36 (2013.01)

(58) Field of Classification Search
CPC ......... G01S 17/36; G01S 17/10; G01S 7/4818
USPC .................................................... 356/5.01
See application file for complete search history.

(56) References Cited

U.S. PATENT DOCUMENTS

| 3,156,755 A | 11/1964 | Wardham et al. |
| 3,158,674 A | 11/1964 | Woodson et al. |
| 3,194,109 A | 7/1965 | Erickson et al. |
| 3,471,239 A | 10/1969 | Woodson et al. |
| 3,535,024 A | 10/1970 | Schindler et al. |
| 3,671,130 A | 6/1972 | Bowker et al. |
| 3,809,477 A | 5/1974 | Russell |
| 3,836,256 A | 9/1974 | Peters |
| 4,274,736 A | 6/1981 | Balmer |
| 4,457,625 A | 7/1984 | Greenleaf et al. |

(Continued)

FOREIGN PATENT DOCUMENTS

WO WO 2005001511 1/2005

OTHER PUBLICATIONS

PCT Search Report and Written Opinion for PCT/US16/16092 dated Nov. 4, 2016.

(Continued)

Primary Examiner — Mark Hellner
(74) Attorney, Agent, or Firm — Remenick PLLC (57) ABSTRACT Laser rangefinders and methods of using laser rangefinders are disclosed. One embodiment of a laser rangefinder includes a first DDS (direct digital synthesizer) outputting a first reference signal, an isolated laser source that receives the first signal and outputs an optical signal, a collimating lens coupled to the isolated laser source adapted to direct the optical signal to free space, a collecting lens positioned adjacent to the collimating lens adapted to receive a modulated optical signal from free space, a pin diode detector coupled to collecting lens, a second DDS outputting a second reference signal, and a computing device adapted to receive the first reference signal, the second reference signal, and the received modulated optical signal and calculate a distance.

31 Claims, 9 Drawing Sheets

(56) References Cited

U.S. PATENT DOCUMENTS

| | | |
|---|---|---|
| 4,502,785 A | 3/1985 | Truax |
| 4,560,271 A | 12/1985 | Fumio |
| 4,595,288 A | 6/1986 | Rambauske |
| 4,689,489 A | 8/1987 | Cole |
| 4,701,049 A | 10/1987 | Beckman et al. |
| 4,790,651 A | 12/1988 | Brown et al. |
| 4,810,088 A | 3/1989 | Karning et al. |
| 5,046,837 A | 9/1991 | Stroomer et al. |
| 5,146,085 A | 9/1992 | Ishizuka et al. |
| 5,148,235 A | 9/1992 | Tank et al. |
| 5,289,434 A | 2/1994 | Berni |
| 5,336,900 A | 8/1994 | Peters et al. |
| 5,446,546 A | 8/1995 | Breidenbach et al. |
| 5,455,670 A | 10/1995 | Payne et al. |
| 5,530,549 A | 6/1996 | Brown |
| 5,689,812 A | 11/1997 | Takahashi |
| 5,815,251 A | 9/1998 | Ehbets et al. |
| 5,861,956 A | 1/1999 | Bridges et al. |
| 5,920,394 A | 7/1999 | Gelbart et al. |
| 6,017,125 A | 1/2000 | Vann |
| 6,163,372 A | 12/2000 | Sallee et al. |
| 6,205,267 B1 | 3/2001 | Aksyuk et al. |
| 6,303,885 B1 | 10/2001 | Hichwa et al. |
| 6,313,918 B1 | 11/2001 | Hill et al. |
| 6,362,468 B1 | 3/2002 | Murakami et al. |
| 6,411,371 B1 | 6/2002 | Hinderling et al. |
| 6,420,694 B1 | 7/2002 | Greenwood |
| 6,587,863 B1 | 7/2003 | Gentile et al. |
| 6,661,447 B2 | 12/2003 | Forrer et al. |
| 6,901,673 B1 | 6/2005 | Cobb et al. |
| 7,101,053 B2 | 9/2006 | Parker |
| 7,130,056 B2 | 10/2006 | Schluchter et al. |
| 7,385,710 B1 | 6/2008 | Sturgill |
| 7,486,707 B2 | 2/2009 | Herkommer et al. |
| 7,586,586 B2 | 9/2009 | Constantikes |
| 7,764,359 B2 * | 7/2010 | Luo ................ G01C 3/08 356/5.1 |
| RE41,877 E | 10/2010 | Parker |
| 2001/0030556 A1 | 10/2001 | Hartman et al. |
| 2002/0139927 A1 | 10/2002 | Check |
| 2004/0150810 A1 | 8/2004 | Muenter et al. |
| 2004/0201516 A1 | 10/2004 | Lyon |
| 2005/0003785 A1 | 1/2005 | Jackson et al. |
| 2005/0057808 A1 | 3/2005 | Houde-Walter |
| 2008/0239281 A1 * | 10/2008 | Bridges ............ G01S 7/491 356/5.09 |
| 2011/0007328 A1 | 1/2011 | Wolf |
| 2011/0032509 A1 | 2/2011 | Bridges |
| 2014/0118718 A1 | 5/2014 | Jungwirth |

OTHER PUBLICATIONS

"Large-Scale Metrology—An Update", Estler, et. al., CIRP Annals-Manufacturing Technology 51(2), 2002.

"Sources of error in a laser rangefinder", K. S. Hashemi, et al., Rev. Sci. Instrum. 65(10) Oct. 1994.

Electronic Distance Measurement, J. M. Rueger, 3rd. Ed., Springer-Verlag, New York, 1990.

J. M. Payne et al.; Rev. of Scientific Instr.; vol. 63, 6; Jun. 1992; p. 3311.

J. M. Payne; Rev. of Scientific Instr.; vol. 44, 3; Mar. 1973; p. 304.

* cited by examiner

FIBER OPTIC BASED LASER RANGE FINDER

REFERENCE TO RELATED APPLICATIONS

This application claims priority to U.S. Provisional Application No. 62/112,234, filed Feb. 5, 2015, which is entitled "Fiber Optic Based Laser Range Finder," and is hereby specifically and entirely incorporated by reference.

RIGHTS IN THE INVENTION

This invention was made with government support under Cooperative Agreements AST-0223851 and AST-0836064, between the National Science Foundation and Associated Universities, Inc., and, accordingly, the United States government has certain rights in this invention.

BACKGROUND

1. Field of the Invention

This invention is directed to a distance measuring apparatus and methods, and, in particular, to a fiber optic based laser ranger finder.

2. Background of the Invention

Large-scale metrology includes the measurement of coordinates over large distances, for example, greater than the volume of a conventional coordinate measurement machine (CMM), which is typically limited to a cube of a few meters. There are many instances, for example in the aircraft industry, radio telescope and linear accelerator applications, where measuring such distances is preferably accomplished with a high degree of accuracy. There are also field measurements of smaller scale which do not lend themselves to placement in a CMM, such as in situ measurements of machinery, outdoor measurements, shop floor measurements, and other well known approaches.

The measurement of coordinates is typically accomplished by measuring a distance and two angles, as with a conventional surveying total station or laser tracking interferometer; the measurement of three orthogonal distances, as with a CMM; the measurement of angles from two locations on a known baseline, such as with theodolites; the measurement of spacing on a two-dimensional image projection from multiple locations, as with photogrammetry; the measurement of distance from three, or more, known locations on a baseline, as with multilateration; and various other manners. "Large-Scale Metrology—An Update", Estler, et. al., CRP Annals—Manufacturing Technology 51(2), 2002, discusses various techniques for large scale metrology.

Laser rangefinders measure distance by measuring the time taken to propagate an optical wavefront from the emitter to target and back and inferring distance from a known or predicted propagation speed. One modality of time measurement is to modulate the amplitude of the CW emitted wavefront and measure the phase difference of the received wavefront modulation with respect to the transmitted one. Techniques of this type are described in Electronic Distance Measurement, J. M. Rueger, 3rd. Ed., Springer-Verlag, New York, 1990. "Sources of error in a laser rangefinder", K. S. Hashemi, et al., Rev. Sci. Instrum. 65(10) October 1994 discusses a laser rangefinder and the associated sources of error.

The National Radio Astronomy Observatory (NRAO) Robert C. Byrd Green Bank Telescope (GBT) is a 100 m diameter advanced single dish radio telescope designed for a wide range of astronomical projects with special emphasis on precision imaging. Open-loop adjustments of the active surface, and real-time corrections to pointing and focus on the basis of structural temperatures already allow observations at frequencies up to 50 GHz. Operation at higher frequencies requires more precise knowledge of optical element position and pose.

Limitations in the prior art do not permit the requisite length measurement accuracy. Limitations include variable phase delays in the detector due to beam spot position uncertainty, run-out of the steering mirror leading to systematic range errors, low rates of zero-point measurements (and equivalently, low chopping rates) leading to inclusion of low-offset frequency phase noise errors, and imprecise measurement of the coupling from transmitter to receiver electronics and optics leading to cyclic errors. The ambiguity in absolute range in single modulation CW rangefinders is also problematic, necessitating prior knowledge of range to less than one-half of the ambiguity range. In addition, economies can be obtained if the control and electro-optics needed for measurement can be multiplexed amongst diverse baselines.

SUMMARY OF THE INVENTION

The present invention overcomes the limitations and disadvantages associated with current strategies and designs and provides fiber optic based laser rangers and methods of using the laser rangers.

One embodiment of the invention is directed to a laser rangefinder. The laser rangefinder includes a first DDS (direct digital synthesizer) outputting a first reference signal, an isolated laser source that receives the first signal and outputs an optical signal, a collimating lens coupled to the isolated laser source adapted to direct the optical signal to free space, a collecting lens positioned adjacent to the collimating lens adapted to receive a modulated optical signal from free space, a pin diode detector coupled to collecting lens, a second DDS outputting a second reference signal, and a computing device adapted to receive the first reference signal, the second reference signal, and the received modulated optical signal and calculate a distance.

Preferably, the laser rangefinder further includes a first single mode fiber optic cable coupling the optically isolated laser source to the collimating lens and a second single mode fiber optic cable coupling the collecting lens to the pin diode detector. The computing device preferably calculates the distance by sampling the difference in frequency of the reference frequency and returned modulated optical signal. In a preferred embodiment, the first reference signal and the second reference signal are of different frequencies.

Preferably, the isolated laser source is a diode laser. Preferably, the diode laser is intensity modulated by the first DDS. The laser rangefinder preferably further includes a double balance mixer. In a preferred embodiment, the collimating lens and the collecting lens are directed toward a reflector.

Another embodiment of the invention is directed to a method of measuring a distance with a laser rangefinder. The method includes the steps of outputting a first reference signal at a first DDS (direct digital synthesizer), receiving the first reference signal at an isolated laser source, outputting an optical signal from the isolated laser source, directing the optical signal to free space with a collimating lens coupled to the isolated laser source, receiving a modulated optical signal from free space at a collecting lens positioned adjacent to the collimating lens, detecting the modulated optical signal at a pin diode detector coupled to the collecting lens, outputting a second reference signal at a second DDS, and calculating the distance on a computing device based on the first reference signal, the second reference signal, and the received modulated optical signal.

In a preferred embodiment a first single mode fiber optic cable couples the optically isolated laser source to the collimating lens and a second single mode fiber optic cable couples the collecting lens to the pin diode detector. Preferably, the computing device calculates the distance by sampling the difference in frequency of the reference frequency and returned modulated optical signal. The first reference signal and the second reference signal are preferably of different frequencies. Preferably the isolated laser source is a diode laser. The diode laser is preferably intensity modulated by the first DDS. The method preferably further includes the step of directing the collimating lens and the collecting lens toward a reflector.

Another embodiment of the invention is directed to a laser rangefinder. The laser rangefinder includes a first DDS (direct digital synthesizer) outputting a first reference signal, an isolated laser source that receives the first signal and outputs an optical signal, a pulsed laser source outputting a pulsed laser, a first optical switch coupled to the isolated laser source and the pulsed laser source, a collimating lens coupled to the first optical switch adapted to direct the optical signal and pulsed laser to free space, a collecting lens positioned adjacent to the collimating lens adapted to receive a modulated optical signal and a return pulse from free space, a second optical switch coupled to the collecting lens, a broad band pin diode detector coupled to the second optical switch adapted to received the return pulse, gating electronics coupled to the broad band pin diode detector adapted to determine the total time between when the pulsed laser was transmitted and the return pulse arrived and calculate an absolute distance, a pin diode detector coupled to the second optical switch adapted to receive the modulated optical signal, a second DDS outputting a second reference signal, and a computing device adapted to receive the first reference signal, the second reference signal, and the received modulated optical signal and calculate a distance.

In a preferred embodiment the laser rangefinder further includes a first single mode fiber optic cable coupling the optically isolated laser source to the collimating lens and a second single mode fiber optic cable coupling the collecting lens to the pin diode detector. Preferably, the computing device calculates the distance by sampling the difference in frequency of the reference frequency and returned modulated optical signal. The first reference signal and the second reference signal are preferably of different frequencies.

Preferably, the isolated laser source is a diode laser. Preferably, the diode laser is intensity modulated by the first DDS. The laser rangefinder preferably further includes a double balance mixer. In a preferred embodiment, the collimating lens and the collecting lens are directed toward a reflector. Preferably, the pulsed laser is associated with the broad band pin diode detector and the isolated laser source is associated with the pin diode detector. In a preferred embodiment, the pulsed laser is used to determine absolute distance and the isolated laser source is used to increase the accuracy of the distance measurement.

Another embodiment is directed to a method of measuring a distance with a laser rangefinder. The method includes the steps of outputting a pulsed laser from a pulsed laser source, directing the pulsed laser to free space with a collimating lens coupled to the pulsed laser source, receiving a return pulse from free space at a collecting lens positioned adjacent to the collimating lens, detecting the return pulse at a broad band pin diode detector, determining the total time between when the pulsed laser was transmitted and the return pulse arrived and calculate an absolute distance at gating electronics coupled to the broad band pin diode detector, outputting a first reference signal at a first DDS (direct digital synthesizer), receiving the first reference signal at an isolated laser source, outputting an optical signal from the isolated laser source, directing the optical signal to free space with the collimating lens coupled to the isolated laser source, receiving a modulated optical signal from free space at the collecting lens, detecting the modulated optical signal at a pin diode detector coupled to the collecting lens, outputting a second reference signal at a second DDS, and improving the accuracy of the absolute distance measurement on a computing device based on the first reference signal, the second reference signal, and the received modulated optical signal.

In a preferred embodiment a first optical switch couples both the pulsed laser source and the isolated laser source to the collimating lens and a second optical switch couples both the broad band pin diode detector and the pin diode detector to the collecting lens. Preferably, the computing device calculates the distance by sampling the difference in frequency of the reference frequency and returned modulated optical signal. Preferably, the first reference signal and the second reference signal are of different frequencies. In a preferred embodiment, the isolated laser source is a diode laser. The diode laser is preferably intensity modulated by the first DDS. The method preferably further includes the step of directing the collimating lens and the collecting lens toward a reflector.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

DESCRIPTION OF THE DRAWINGS

The invention is described in greater detail by way of example only and with reference to the attached drawings, in which.

DESCRIPTION OF THE INVENTION

As embodied and broadly described herein, the disclosures herein provide detailed embodiments of the invention. However, the disclosed embodiments are merely exemplary of the invention that can be embodied in various and alternative forms. Therefore, there is no intent that specific structural and functional details should be limiting, but rather the intention is that they provide a basis for the claims and as a representative basis for teaching one skilled in the art to variously employ the present invention.

Large-scale metrology involves the measurement of coordinates over large distances. The measurement of coordinates over large distances is typically accomplished by measuring a distance and two angles, as with a conventional surveying total station or laser tracking interferometer. One type of metrology device transmits an intensity modulated signal, and then, using a heterodyne receiver, measures the difference in phase of the received AM signal with that of a local oscillator that has the same phase as the transmitted signal. Based on the index of refraction of the medium the path length from the transmitter to the receiver can be inferred. Measurements by conventional metrological devices are limited by the ambiguity modulo $2\pi$ radians between the phase of the AM signal and the phase of the local oscillator.

A ranging system for accurately measuring the distance to a retro-reflector for lengths greater than 100 meters is disclosed using fiber optic technology. To improve accuracy and determine absolute distances, a time of flight measuring technique is preferably combined with a differential phase technique. Since the wavelength of a picosecond pulsed laser is the same as the intensity modulated laser diode, preferably an optical switch can switch between the measurement techniques. The differential phase method preferably has higher signal to noise ratio and is better suited for locating a retro-reflector. The differential phase method allows a more accurate determination of position, but is limited to a relative measure constrained by the intensity modulation wavelength. The time of flight option is capable of measuring absolute distance but with less accuracy and more power consumption.

Figure 1:
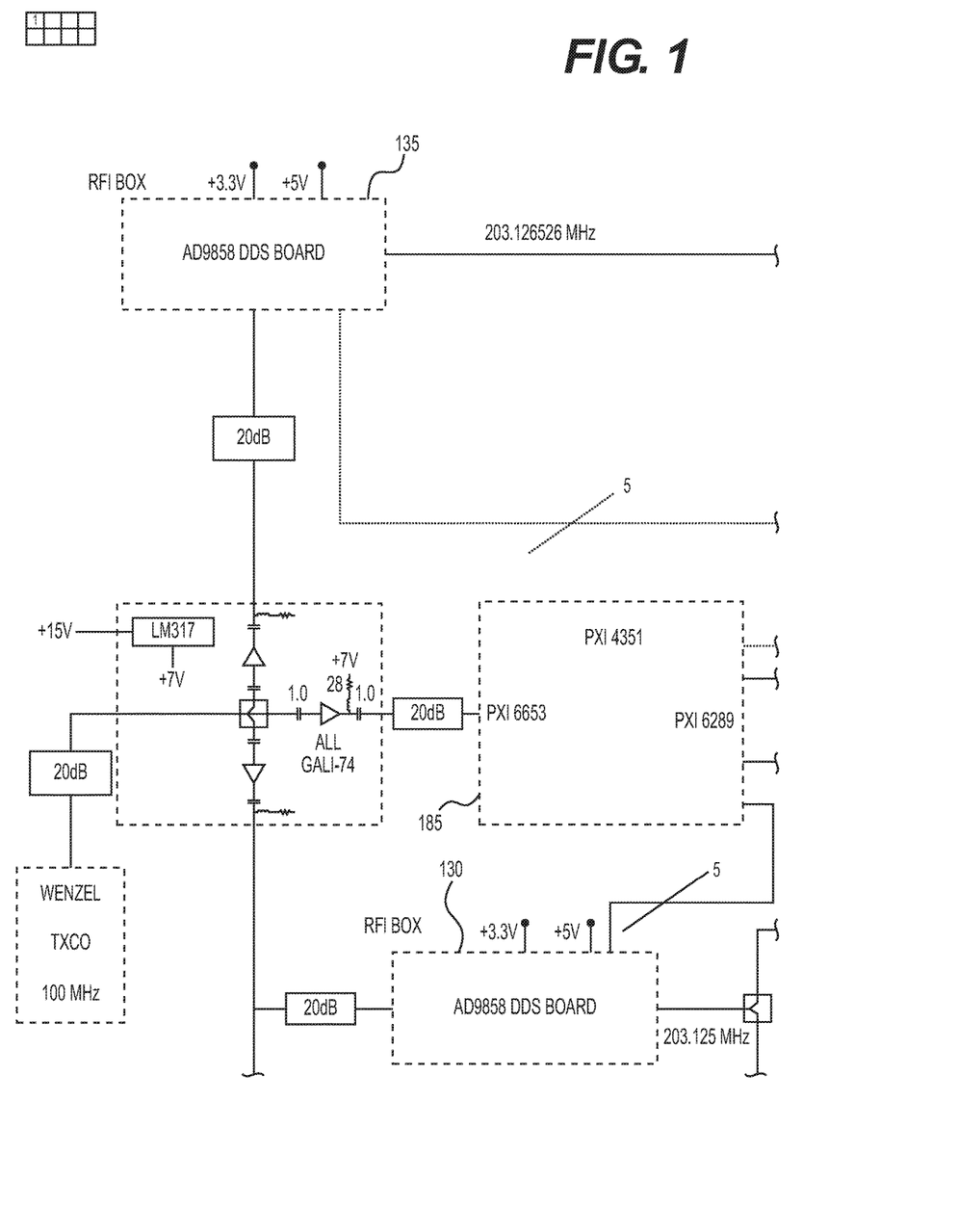
FIG. 1 depicts block diagram of an embodiment of a laser ranger.

As depicted in FIG. 1, preferably, an optically isolated semiconductor laser is intensity modulated at a frequency that determines the modular wavelength of the measurement. A single mode fiber optic cable 110 preferably connects the optically isolated laser source 105 to a collimating lens 115 where an adjacent collecting lens 120 preferably directs the returned laser power via another single mode fiber 125 to the pin diode detector 155. The returned de-modulated laser power preferably contains the phase information necessary to accurately measure the desired relative distance. Currently, accuracy is not noise limited but rather limited from phase detection nonlinearities. The phase measurement and distance calculation is preferably accomplished by sampling the difference frequency of the reference frequency and detected modulated laser signal. A proposed lock-in amplifier phase measurement could potentially improve the accuracy of the system.

The time of flight method preferably uses a pulsed laser and broad band pin diode detector. This method determines the round trip travel time of the pulse by tracking the number of clock pulse between the transmit time and arrival time of the detected pulse. An absolute distance then can be calculated from the travel time.

Differential Phase DDS Synthesizer

As depicted in FIG. 1, two DDS (direct digital synthesizer) chips 130 and 135 are set to 203.125 MHz and 203.125 MHz plus 1.52587891 KHz giving a measurement wavelength of $\lambda=1.4758902447764064$ meters. The direct digital synthesizer's ICs (integrated circuits) are very temperature sensitive and prone to overheating. Preferably each DDS is grounded to create good thermal path from the IC package to the heat sink. Each DDS is preferably mounted in thermally connected mechanical enclosures, which allow the phase of the devices to track as the temperature changes.

The effective temperature coefficient for these devices is ~100 um/° C. Thus, the temperatures of the enclosures are preferably held within 1° C. for 100 um accuracy. The DDS chips are preferably programmed via a serial data input, a clock input and a control bit. These are optically isolated with Optical Isolator devices and then input to a serial to parallel registers. A frequency update (FUD), reset, and write control lines may also be used to program the devices. A National Instruments PXI platform computer, 185, samples the reference and returned signals then calculates the phase difference and converts to distance using internal routines. This computer may be replaced with a lock-in amplifier detection to improve the accuracy of the measurement.

Differential Phase Optics

Often, reflected energy reentering the semiconductor laser cavity causes phase instability. Diode lasers typically incorporate a Faraday isolator at the laser output to eliminate this effect. Preferably, a diode laser 140 of optical wavelength 1310 nanometers is utilized. The electronics', including the laser and photodetector's, noise limitation is preferably less than 10 micrometers rms distance ranging with the following parameters: bandwidth of about 100 Hz, integration time of about 0.167 mS, 20 dB optical loss, and 0 dBm RF input power. The signal to noise ratio with these parameters is 120 dB/Hz over a 20-meter distance. From this experiment, the RF signal level and optical power level must be increased by 14 dB to achieve the same accuracy at 100 meter ranging. The transmitter is preferably temperature controlled and biased with a controller mounted in an RFI tight enclosure to reduce cross coupling from the reference channel.

The diode laser is preferably intensity modulated with one of the DDS synthesizers. The optical signal is then preferably split by a 1% coupler, with the coupled path input to a reference detector 145. The 99% path is coupled to free space with a collimating lens 115 directed to a target, for example hollow corner cube 150. Preferably, transmit lens 115 and collecting lens 120 are fixed in place. However, transmit lens 115 and collecting lens 120 can be movable or use mirrors to focus on different targets. The transmit lens 115 preferably has a calculated optical loss of about 13 dB at 100 meters from the divergence of the beam. Metrology Lab experiments indicate that the actual path loss for 20 meters is about 20 dB, which indicates an extra 14 combined coupling and reflection loss. A photodetector 120 is preferably a photodetector chip and a collimating lens. The lens preferably has a 8.0 mm clear aperture to captured sufficient reflected energy for 100 meter operation.

Figure 2:
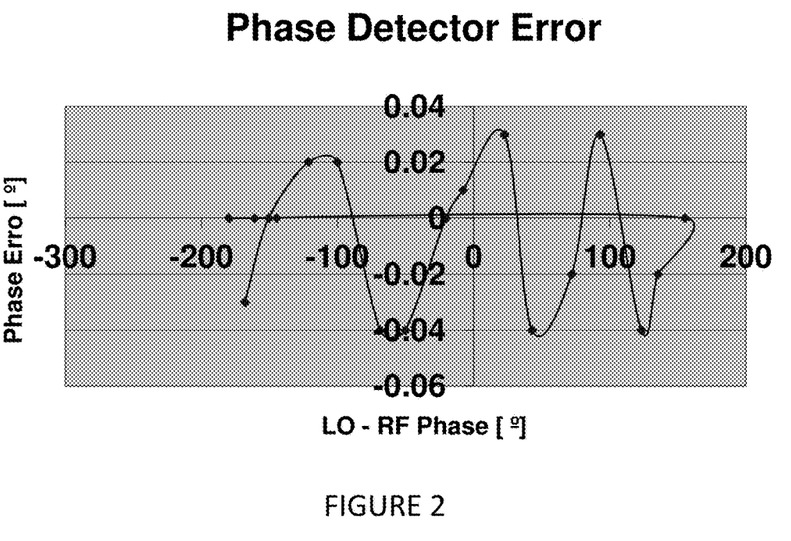
FIG. 2 depicts the measured error produced an embodiment of the phase detector. The data was taken by inserting a known phase shift 58.25° at difference absolute phase differences, $\Delta\theta$, between the LO and RF signals at frequency $\omega$. The error indicates the nonlinearity across the entire range of 360°.
Figure 3:
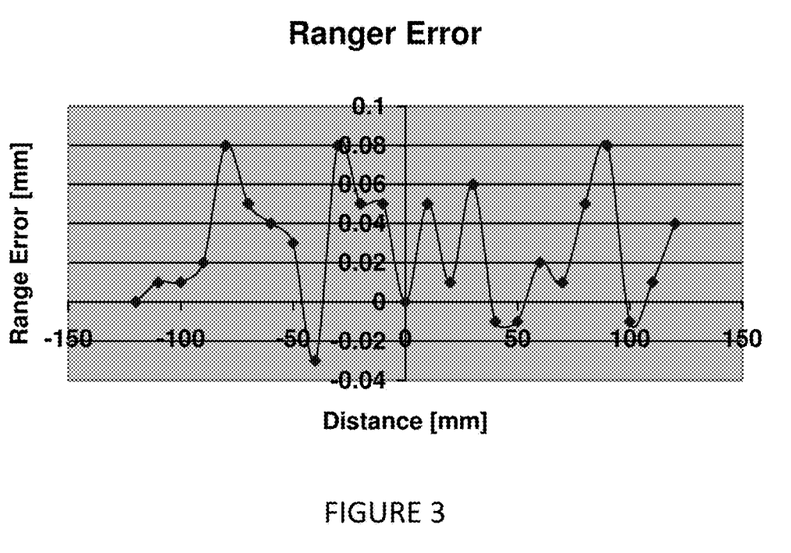
FIG. 3 depicts the measured error of an embodiment of the range finder. The data is the deviation after a known linear systematic error is removed. The error indicates the nonlinearity in the measured range of −120 mm to 120 mm.

The ideal response is determined by:

$$A \times \mathrm{Sin}(\omega t + \Delta\theta),$$

where, $\omega$, is the frequency difference between the transmit and local oscillator frequencies, $\Delta\theta$ is the phase difference and the amplitude, A, is a function of signal amplitudes and detector gain. The term $\Delta\theta$ is a function of the absolute difference, which creates nonlinearities in response. The isolation between LO (local oscillator) and RF (radio frequency) ports of the mixer determines the magnitude of the nonlinearity. The mixer circuit design preferably reduces phase error caused by the random phase setting of the local oscillator. The device preferably utilizes an internally designed double balance mixer, optimized for the ranger frequency, that is mounted in a block that reduces coupling between LO and RF. Additionally, Schottky diodes are preferably employed. The capacitance of the Schotky diodes determines the input impedance, and ultimately coupling loss. A surface mount package quad ring with a capacitance of 5 pf is preferably additionally included. The device is preferably constructed on ⅛" FR4 pc board material with the toroidal baluns wound on 11-040-K material. The phase accuracy over 360 degrees is shown in the FIG. 2 with FIG. 3 giving the corresponding range accuracy. Preferably, a 0.020" thick board is utilized. The design equations for the mixer are, $Z_{cap}$=–j156 Ω @ 201 MHz, $Z_{in}$=50 with balun equation:

$$N^2 = \frac{Z_{in}}{2*Z_{cap}} = 1.5 \text{ turns.}$$

Time of Flight Measurement

A pulsed laser 160 is preferably coupled to the fiber optic to free space optics 115 with the addition of an optical switch 165. Another optical switch 170 in the receive path 120 preferably directs the return pulse to a broad band pin diode detector and amplifier 175 used in the narrow band pulse. Gating electronics 180 preferably determine the total time between when the pulse was transmitted and the return pulse arrived. The absolute distance is preferably determined by the total travel time and assumptions of the integrated index of refraction along the flight path of the pulse. Accuracy is a function of the pulse width and sampling time of the gating electronics. With a pulse width of t=50 picoseconds, the highest resolution of the measurement is, $$\frac{c\,\tau}{2} = 7.5 \text{ mm}$$

This would preferably require a sampling frequency of 40 GHz. Since the differential phase method described herein can resolve distances less than λ/2, or 738 mm, the sampling frequency can by lowered by a factor of 100 to 400 MHz and still achieve the desired accuracy. The modulation frequency and sampling frequency can be adjusted to optimize the performance of the system.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A laser rangefinder comprising:
   a first DDS (direct digital synthesizer) outputting a first reference signal;
   a first pin diode detector coupled to an isolated laser source;
   a first demodulated laser source input to a first double balanced mixer;
   an isolated laser source that receives the first reference signal and outputs an optical signal;
   a collimating lens coupled to the isolated laser source adapted to direct the optical signal to free space;
   a collecting lens positioned adjacent to the collimating lens adapted to receive a modulated optical signal from free space;
   a second pin diode detector coupled to collecting lens;
   a second demodulated optical signal input to a second double balanced mixer;
   a second DDS outputting a second reference signal;
   the second reference signal input to each double balanced mixer; and
   a computing device adapted to receive the first reference signal, the second reference signal, and the received modulated optical signal and calculate a distance by sampling a difference frequency to determine the phase.

2. The laser rangefinder of claim 1, further comprising a first single mode fiber optic cable coupling the isolated laser source to the collimating lens and a second single mode fiber optic cable coupling the collecting lens to the second pin diode detector.

3. The laser rangefinder of claim 1, further comprising a single mode fiber optic cable coupling the isolated laser source to a pin diode detector.

4. The laser rangefinder of claim 1, wherein the first reference signal and the second reference signal are of different frequencies.

5. The laser rangefinder of claim 1, wherein the isolated laser source is a diode laser.

6. The laser rangefinder of claim 5, wherein the diode laser is intensity modulated by the first DDS.

7. The laser rangefinder of claim 1, wherein the collimating lens and the collecting lens are directed toward a reflector.

8. A method of measuring a distance with a laser rangefinder, comprising:
   outputting a first reference signal at a first DDS (direct digital synthesizer);
   coupling a first pin diode detector to an isolated laser source;
   inputting a first demodulated laser source into a first double balanced mixer;
   receiving the first reference signal at an isolated laser source;
   outputting an optical signal from the isolated laser source;
   directing the optical signal to free space with a collimating lens coupled to the isolated laser source;
   receiving a modulated optical signal from free space at a collecting lens positioned adjacent to the collimating lens;
   detecting the modulated optical signal at a second pin diode detector coupled to the collecting lens;
   inputting a second demodulated optical signal into a second double balanced mixer;
   outputting a second reference signal at a second DDS; and
   calculating the distance on a computing device by sampling a difference frequency to determine the phase.

9. The method of claim 8, wherein a first single mode fiber optic cable couples the isolated laser source to the collimating lens and a second single mode fiber optic cable couples the collecting lens to the second pin diode detector.

10. The method of claim 8, further comprising coupling the isolated laser source to a pin diode detector with a single mode fiber optic cable.

11. The method of claim 8, wherein the first reference signal and the second reference signal are of different frequencies.

12. The method of claim 8, wherein the isolated laser source is a diode laser.

13. The method of claim 12, wherein the diode laser is intensity modulated by the first DDS.

14. The method of claim 8, further comprising directing the collimating lens and the collecting lens toward a reflector.

15. A laser rangefinder comprising:
a first DDS (direct digital synthesizer) outputting a first reference signal;
an isolated laser source that receives the first signal and outputs an optical signal;
a pulsed laser source outputting a pulsed laser;
a first optical switch coupled to the isolated laser source and the pulsed laser source;
a collimating lens coupled to the first optical switch adapted to direct the optical signal and pulsed laser to free space;
a collecting lens positioned adjacent to the collimating lens adapted to receive a modulated optical signal and a return pulse from free space;
a second optical switch coupled to the collecting lens;
a broad band pin diode detector coupled to the second optical switch adapted to received the return pulse;
gating electronics coupled to the broad band pin diode detector adapted to determine the total time between when the pulsed laser was transmitted and the return pulse arrived and calculate an absolute distance;
a pin diode detector coupled to the second optical switch adapted to receive the modulated optical signal;
a second DDS outputting a second reference signal; and
a computing device adapted to receive the first reference signal, the second reference signal, and
the received modulated optical signal and calculate a distance.

16. The laser rangefinder of claim 15, further comprising a first single mode fiber optic cable coupling the optically isolated laser source to the collimating lens and a second single mode fiber optic cable coupling the collecting lens to the pin diode detector.

17. The laser rangefinder of claim 15, wherein the computing device calculates the distance by sampling the difference in frequency to determine the phase of the reference frequency and returned modulated optical signal.

18. The laser rangefinder of claim 15, wherein the first reference signal and the second reference signal are of different frequencies.

19. The laser rangefinder of claim 15, wherein the isolated laser source is a diode laser.

20. The laser rangefinder of claim 19, wherein the diode laser is intensity modulated by the first DDS.

21. The laser rangefinder of claim 15, further comprising a double balance mixer.

22. The laser rangefinder of claim 15, wherein the collimating lens and the collecting lens are directed toward a reflector.

23. The laser rangefinder of claim 15, wherein the pulsed laser is associated with the broad band pin diode detector and the isolated laser source is associated with the pin diode detector.

24. The laser rangefinder of claim 23, wherein the pulsed laser is used to determine absolute distance and the isolated laser source is used to increase the accuracy of the distance measurement.

25. A method of measuring a distance with a laser rangefinder, comprising:
outputting a pulsed laser from a pulsed laser source;
directing the pulsed laser to free space with a collimating lens coupled to the pulsed laser source;
receiving a return pulse from free space at a collecting lens positioned adjacent to the collimating lens;
detecting the return pulse at a broad band pin diode detector;
determining the total time between when the pulsed laser was transmitted and the return pulse arrived and calculate an absolute distance at gating electronics coupled to the broad band pin diode detector;
outputting a first reference signal at a first DDS (direct digital synthesizer);
receiving the first reference signal at an isolated laser source;
outputting an optical signal from the isolated laser source;
directing the optical signal to free space with the collimating lens coupled to the isolated laser source;
receiving a modulated optical signal from free space at the collecting lens;
detecting the modulated optical signal at a pin diode detector coupled to the collecting lens;
outputting a second reference signal at a second DDS; and
improving the accuracy of the absolute distance measurement on a computing device based on the first reference signal, the second reference signal, and the received modulated optical signal.

26. The method of claim 25, wherein a first optical switch couples both the pulsed laser source and the isolated laser source to the collimating lens and a second optical switch couples both the broad band pin diode detector and the pin diode detector to the collecting lens.

27. The method of claim 25, wherein the computing device calculates the distance by sampling the difference in frequency of the reference frequency and returned modulated optical signal.

28. The method of claim 25, wherein the first reference signal and the second reference signal are of different frequencies.

29. The method of claim 25, wherein the isolated laser source is a diode laser.

30. The method of claim 29, wherein the diode laser is intensity modulated by the first DDS.

31. The method of claim 25, further comprising directing the collimating lens and the collecting lens toward a reflector.

* * * * *

UNITED STATES PATENT AND TRADEMARK OFFICE
CERTIFICATE OF CORRECTION

Page 1 of 1

PATENT NO. : 9,983,298 B2
APPLICATION NO. : 15/013251
DATED : May 29, 2018
INVENTOR(S) : White It is certified that error appears in the above-identified patent and that said Letters Patent is hereby corrected as shown below:

On the Title Page

Item (73), delete "Assoicated Universties, LLC" and insert therefore --Associated Universities, Inc.--

Signed and Sealed this
Thirty-first Day of July, 2018

Andrei Iancu
*Director of the United States Patent and Trademark Office*